though a solvent such as carbon tetrachloride gave a product which had an average of at most 2.5 chlorines per phenyl radical and usually was of the order of about 2.1 to 2.2 chlorine atoms per phenyl radical. In addition, the use of ferric chloride as the chlorination catalyst gave no evidence of the formation of tetrachlorophenyltrichlorosilane, and was accompanied by the additional disadvantage that there was a great deal of cleavage of the phenyl nucleus from the silicon atom.

United States Patent Office 2,887,503
Patented May 19, 1959

2,887,503

METHOD FOR PREPARING CHLOROPHENYLCHLOROSILANES

Norman G. Holdstock, Scotia, N.Y., assignor to General Electric Company, a corporation of New York No Drawing. Application August 19, 1957
Serial No. 679,064

5 Claims. (Cl. 260—448.2)

This invention is concerned with a method for preparing chlorophenylchlorosilanes by the direct chlorination of a phenylchlorosilane. More particularly, the invention relates to a process for making a chlorophenylchlorosilane containing in excess of three chlorine atoms attached directly to the phenyl nucleus, which process comprises subjecting a phenylchlorosilane corresponding to the general formula $$(C_6H_5)_nSiCl_{4-n}$$

to reaction with chlorine in the presence of a catalyst composed of ferric chloride and antimony pentachloride where $n$ is an integer equal to from 1 to 3, inclusive.

Chlorinated phenyl organopolysiloxanes have been found to have improved lubricity characteristics when operating under a load at both high and low temperatures. Thus, in U.S. Patents 2,599,984 and 2,599,917, it has been disclosed that the presence of chlorine atoms substituted on an aryl nucleus, particularly a phenyl nucleus in a phenylpolysiloxane, has better lubricity characteristics when employed as a lubricant in bearings operating at extremes of temperature especially under high load, as compared to similar organopolysiloxane lubricants containing silicon-bonded phenyl radicals free of any nuclearly bonded chlorine atoms. In order to prepare chlorinated phenylchlorosilanes which are used in making these chlorophenyl polysiloxanes, it is essential that the chlorophenylchlorosilane be prepared by commercially feasible methods and that the level of chlorination on the phenyl nucleus be sufficiently high, that is, be of the order of at least three chlorine atoms per phenyl nucleus, in order to impart the desired degree of lubricity. In addition, it is also essential in preparing these phenylchlorosilanes that the chlorine on the phenyl nucleus be substituted in place of a hydrogen previously present on the phenyl nucleus instead of being the result of addition of the chlorine across the benzenoid unsaturation. Moreover, the obtaining of these chlorophenylchlorosilanes must be accomplished with minimum losses due, for instance, to the formation of undesirable by-products, cleavage of the benzene ring from the silicon atom, etc.

Previously known methods for obtaining chlorinated phenylchlorosilanes have involved use of the Grignard reaction, Friedel-Crafts type reactions, and direct chlorination of the phenylchlorosilanes, as in the aforesaid U. S. Patent 2,599,984, Fletcher et al., where it is suggested that chlorophenylchlorosilanes can be made from phenylchlorosilanes, by direct chlorination of the phenylchlorosilane with chlorine in the presence of FeCl$_3$ as the catalyst. However, this method as well as other previously known methods for chlorination are unsatisfactory from an economy and yield viewpoint when applied to chlorination of phenylchlorosilanes.

One of the important factors to be considered is the ability to obtain a hydrolyzable chlorophenylchlorosilane used in the preparation of the aforesaid chlorophenylpolysiloxanes in which the phenyl nucleus has an average of more than three chlorine atoms substituted thereon. Attempts to prepare chlorophenylchlorosilanes in which there are present at least three chlorine atoms on the phenyl nucleus employing the usual methods disclosed or taught in the prior art were either impractical or unsatisfactory. Thus, attempts to chlorinate phenyltrichlorosilane directly with gaseous chlorine using ferric chloride as the catalyst even in the presence of a solvent such as carbon tetrachloride gave a product which had an average of at most 2.5 chlorines per phenyl radical and usually was of the order of about 2.1 to 2.2 chlorine atoms per phenyl radical. In addition, the use of ferric chloride as the chlorination catalyst gave no evidence of the formation of tetrachlorophenyltrichlorosilane, and was accompanied by the additional disadvantage that there was a great deal of cleavage of the phenyl nucleus from the silicon atom.

Attempts to use other chlorinating catalysts such as iodine, cuprous chloride, cupric chloride, antimony trichloride, etc., were also unsuccessful for preparing desirable amounts of chlorophenylchlorosilanes or to obtain chlorophenylchlorosilanes having the desired degree of chlorine substitution on the phenyl nucleus. Thus, iodine, which is a well known chlorinating catalyst, was entirely unsatisfactory because the rate of chlorination of the phenylchlorosilanes was extremely slow even when chlorination was made directly into the phenylchlorosilane without any solvent. Moreover, excessive dephenylation occurred employing the iodine as a catalyst. A still further difficulty attendant the use of iodine as a catalyst was the fact that instead of substituting chlorine in place of hydrogen on the phenyl nucleus, the chlorine was added across the double bond of the benzenoid unsaturation so that the products thus obtained were unstable at elevated temperatures. Even well known chlorinating catalysts such as cupric and cuprous chlorides showed no effects as far as chlorination of the phenyl nucleus of phenylchlorosilanes was concerned and no chlorophenylchlorosilanes were obtained.

Attempts to use iron powder alone as the catalyst, for instance, as disclosed in U.S. Patent 2,258,219, gave a fairly good level of higher chlorinated phenylchlorosilanes but there was an extremely high degree of dephenylation as evidenced by the appearance of almost one-third of the reaction product in the form of chlorinated benzenes. When only an antimony halide, for instance, antimony pentachloride was employed, again as disclosed, for instance, in U.S. Patent 2,258,219, no evidence of the formation of chlorinated phenylchlorosilanes in excess of three chlorine atoms on the phenyl nucleus was obtained. Accordingly, it was entirely unexpected and in no way could have been predicted that the concurrent use of finely divided ferric chloride and antimony chloride could give the extremely high yields of chlorophenylchlorosilanes containing four chlorine atoms on the phenyl nucleus together with low amounts of dephenylation products.

What is equally as important as the high chlorine introduction in the phenyl nucleus is the fact that no solvent is necessary in which to conduct the chlorination reaction. By obviating the necessity of using a solvent with the attendant cost of the solvent and the cost of recovering the same, economy in the preparation of the chlorophenylchlorosilanes can be realized. In addition, the equipment in which the chlorination reaction is carried out can be more efficently used due to the fact that no volume of the equipment is required for confining any solvent medium.

The ferric chloride employed is soluble to a sufficient extent in the phenylchlorosilane undergoing chlorination to present no dispersion problems of this particular portion of the catalyst, especially if agitation of the reaction mixture is employed as is advantageously done. Although ferric chloride (FeCl₃) is advantageously used, it will be apparent to those skilled in the art, and it is intended to be included within the scope of the invention, that the starting material may be any iron compound, including finely divided iron powder which, in the presence of the chlorine being used for chlorination purposes, is converted to ferric chloride in situ. Thus, in addition to starting with finely divided iron powder, one could also employ initially in the reaction mixture ferrous chloride, iron salts which are converted to ferric chloride in the presence of chlorine, for instance, ferric acetate, ferrous acetate, iron hydroxide, ferric oxychloride, ferric octoate, etc. Advantageously, I may use either finely divided iron or ferric chloride (FeCl₃).

Since antimony pentachloride is a liquid at room temperature and is quite soluble in the phenylchlorosilanes being chlorinated, no particular problem is encountered in the use of this portion of the catalyst system. Although antimony pentachloride is the active ingredient, it is to be understood and included within the scope of the invention that one may initially employ antimony metal or antimony compounds which, in the presence of chlorine used as the chlorinating agent, are converted to the antimony pentachloride state. Included among such antimony compositions which may be used for this purpose to form antimony pentachloride in situ, one may mention, in addition to the antimony metal (which should be in a finely divided state if so employed), antimony trichloride, antimony octoate, antimony acetate, antimony oxychloride, antimony oxide, etc.

The proportions of the ferric chloride and the antimony chloride in the catalyst system may be varied generally within fairly wide limits. On a weight basis, I may use from about 0.05 to 10 or more parts of the ferric chloride per part of the antimony chloride. Within this range, optimum results are obtained although it will be apparent to those skilled in the art that other ranges of these two ingredients may be employed without departing from the scope of the invention. For best efficiency, the preparation of the two catalytic agents ranges from 0.1 to 5 parts ferric chloride per part antimony pentachloride.

The amount of the catalytic mixture of the ferric chloride and the antimony pentachloride is advantageously varied within certain limits. I preferably employ the mixture of the ferric chloride and antimony chloride on a weight basis in an amount equal to from 0.05 to 5 percent, preferably from 0.1 to 3 percent, based on the weight of the phenylchlorosilane (or mixture of phenylchlorosilanes) undergoing chlorination. For purposes of calculating the proportions of the catalytic ingredients, it is often desirable, particularly when referring to the ferric chloride, to express the ferric chloride or antimony chloride in terms of either the iron or antimony metal although reference to the ferric chloride and the antimony pentachloride may also be made directly on a weight basis.

In carrying out the reaction, the gaseous chlorine is introduced into the phenylchlorosilane which is intimately admixed with the catalyst mixture. As the chlorine introduction begins, the temperature of the reaction mass will rise and will usually range from about 50° to 125° C. or higher up to the reflux temperature of the mass. Generally, temperatures of about 75° to 115° C. should be employed, and if autogenous temperature (of the reaction) is insufficient to maintain the reaction conditions at the desired level, external heat may be applied to the reaction mass to keep the reactants at a constant temperature. During this operation, anhydrous conditions should be maintained by suitably protecting the reaction mass from the atmosphere in order to avoid undesirable hydrolysis of the initial reactant, namely, the phenylchlorosilane or of the formed chlorophenylchlorosilanes. Passage of the chlorine into the reaction mixture is preferably from the bottom of the latter so that chlorine is diffused through the reaction mass. Stirring is advantageously employed during this reaction.

The rate of addition is not critical and may be varied widely. On a weight basis, the amount of chlorine is advantageously introduced into the phenylchlorosilane at the rate of about 0.03 to about 0.2 part chlorine per hour per part of phenylchlorosilane in the solution. Obviously, wider ranges of chlorine introduction may be employed as, for instance, from about 0.5 to 1 or more parts chlorine per hour per part of phenylchlorosilane.

After the reaction has bone to completion, the reaction mixture is subjected to fractional distillation in order to isolate the chlorophenylchlorosilanes formed. It will be found that such fractional distillation will give extremely high yields of highly chlorinated phenylchlorosilanes, for instance, tetrachlorophenylchlorosilanes, and remarkably low polychlorinated amounts of benzene which might be expected as a result of the dephenylation of the phenylchlorosilanes.

In order that those skilled in the art may better understand how the present invention may be practiced, the following examples are given by way of illustration and not by way of limitation. All parts are by weight.

EXAMPLE 1

In this example 500 grams of freshly distilled phenyltrichlorosilane were placed in a one-liter, three-necked flask fitted with a condenser, stirrer, chlorine gas inlet tube, and a thermometer. The flask, condenser and fittings were painted black to eliminate any actinic activation. Various catalyst systems were employed with the amount of phenyltrichlorosilane indicated in Table I below. While the catalyst was being suitably dispersed through the phenyltrichlorosilane by stirring, chlorine gas was introduced over a period of about 33 to 36 hours so that approximately 900 grams chlorine were used in each instance. Since some of the reactions did not produce sufficient heat of reaction to maintain approximately 100° C. (this is the temperature which was believed optimum for the conditions of these reactions), external heat was applied to keep the reactions at this temperature. The following Table I shows the time at which the chlorination reaction was carried out as well as the catalyst system used. Table II shows the disposition of the chlorophenylchlorosilanes, as well as the amount of polychlorinated benzene (obtained as a result of dephenylation caused by the catalyst) in the reaction products.

*Table I*

| Run No. | Total Hours' Reaction | Catalyst |
|---|---|---|
| 1 | 33 | None. |
| 2 | 36 | 2.5 grams iron powder. |
| 3 | 36 | 0.5 gram SbCl₅. |
| 4 | 33 | 2.5 grams FeCl₃ (anhydrous). |
| 5 | 33 | 2.5 grams iron powder and 0.5 gram SbCl₅. |

*Table II*

| | Run Number | | | | |
|---|---|---|---|---|---|
| | 1 | 2 | 3 | 4 | 5 |
| | Percent | Percent | Percent | Percent | Percent |
| φSiCl₃ | 100 | | | | |
| φCl₂SiCl₃ | | | 75.1 | 1.6 | 4.6 |
| φCl₃SiCl₃ | | 9 | 24.2 | 2.0 | .8 |
| φCl₄SiCl₃ | | 66.1 | | 55.6 | 85.5 |
| C₆Cl₆ | | 32.6 | | 40.8 | 9.0 |

As can be seen from the results in Table II, the conjoint presence of iron (which was ultimately converted to FeCl₃) and antimony pentachloride, in addition to giving the highest yield of tetrachlorophenyltrichlorosilane, also yielded the lowest amount of benzene, as contrasted to those runs which produced tetrachlorophenyltrichlorosilane, but used other catalyst systems.

EXAMPLE 2

A large scale run was conducted similarly as in Example 1, employing in this instance 250 lbs. of phenyltrichlorosilane, 1.25 lbs. iron powder and 0.25 lb. antimony pentachloride. About 400 lbs. chlorine were introduced uniformly over a period of about 35 hours in a manner similar to that described in Example 1, while the reaction mass was maintained at a temperature of about 100° C. As a result of fractional distillation of the reaction product, it was found that 76 percent of the reaction product was tetrachlorophenyltrichlorosilane and only about 9 percent was chlorinated benzenes.

The following Example 3 shows the effect of using iron powder in combination with antimony pentachloride in one instance, and in another instance the combination of preformed ferric chloride and antimony pentachloride, employing in each instance the same amount of antimony pentachloride and the same amount of iron whether in the form of iron powder or ferric chloride.

EXAMPLE 3

In this example 500 grams of freshly distilled phenyltrichlorosilane was charged to a one-liter flask of the type described in Example 1, together with 2.5 grams iron powder and 0.5 gram (0.22 cc.) antimony pentachloride. A similar vessel was charged with 500 grams of freshly distilled phenyltrichlorosilane together with 7.25 grams ferric chloride and 0.5 gram antimony pentachloride. It will be apparent that if all the iron added as finely divided metallic iron was converted to ferric chloride, it would give 7.25 grams of ferric chloride. Each mixture of ingredients was subjected to chlorination at a feed rate sufficient to maintain the pot temperature at 100° C. (using a total of about 900 grams chlorine). After four hours of chlorine passage, some external heat was needed to maintain the 100° C. temperature. The chlorination was continued at an even rate for about 14 hours. Thereafter the reaction mixtures were freshly distilled and analyzed with the results shown in Table III.

*Table III*

|  | Run Number | |
| --- | --- | --- |
|  | 6 | 7 |
|  | 0.5% Metallic Fe+0.1% SbCl₅ | 1.45— FeCl₃+0.1% SbCl₅ |
|  | Percent | Percent |
| $\phi SiCl_3$ | 0 | 0 |
| $\phi Cl_2SiCl_3$ | 11 | 3 |
| $\phi Cl_3SiCl_3$ | 12 | 2 |
| $\phi Cl_4SiCl_3$ | 72 | 86 |
| $C_6Cl_6$ | 5 | 9 |

It will be apparent from the above Table III that both the metallic iron and the preformed ferric chloride catalyst systems are equally effective in reducing the amount of cleavage of phenyl groups and in causing high degrees of chlorination of the phenyltrichlorosilane. The use of the preformed ferric chloride catalyst has the advantage that the ferric chloride does not have to be formed first by the action of the chlorine and therefore there is some advantage in that the degree of chlorination is somewhat greater with the use of the preformed ferric chloride catalyst as evidenced by the fact that there was approximately 14 percent more tetrachlorophenyltrichlorosilane formed using the preformed ferric chloride than was formed using the metallic iron catalyst.

EXAMPLE 4

Chlorinated diphenyldichlorosilanes may be prepared in the same manner as described in the foregoing two examples with the exception that diphenyldichlorosilane is substituted in place of the phenyltrichlorosilane used in the preceding examples. By employing these procedures, one will obtain mixtures of chlorinated diphenyldichlorosilanes as, for instance, dichlorodiphenyldichlorosilane, trichlorodiphenyldichlorosilane, tetrachlorodiphenyldichlorosilane, pentachlorodiphenyldichlorosilane, octachlorodiphenyldichlorosilane, etc., the chlorine atoms being disposed on the phenyl nuclei in various positions.

It will, of course, be apparent to those skilled in the art that other proportions of ingredients, as well as other antimony salts convertible to the antimony pentachloride state and iron salts convertible to the ferric chloride state, many examples of which have been given previously, may be employed in place of those used in the preceding examples. Obviously, variations in reaction conditions, temperature, etc. may be used without adversely affecting the desired results.

Chlorophenylchlorosilanes prepared in accordance with the present invention may be used to make organopolysiloxane lubricating oils by hydrolyzing the chlorophenylchlorosilanes either alone or in combination with other organochlorosilanes, for instance, trimethylchlorosilane, dimethyldichlorosilane, diphenyldichlorosilane, etc. More particular directions for preparing such chlorinated phenyl organopolysiloxanes of improved lubricity characteristics, particlularly when operating under a load at both high and low temperatures, may be found in the foregoing U.S. Patents 2,599,984 and 2,599,917. The fluids prepared from the chlorophenylchlorosilanes herein described may be modified with various other ingredients, especially when used to make lubricants such as, for instance, antioxidants, soaps, such as lithium-2-ethyl hexoate (to make greases), inhibitors, etc. The aforesaid fluids can also be used as hydraulic fluids and in electrical equipment, for instance, as electrical fluids in such materials as transformers, capacitors, etc.

What I claim as new and desire to secure by Letters Patent of the United States is:

1. The process for making chlorophenylchlorosilanes containing more than three chlorine atoms per phenyl nucleus, which process comprises chlorinating with gaseous chlorine a phenylchlorosilane corresponding to the general formula $$(C_6H_5)_n SiCl_{4-n}$$

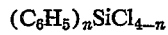

where $n$ is an integer equal to from 1 to 3, inclusive, in the presence of catalytic amounts of a mixed catalyst system composed of ferric chloride and antimony pentachloride.

2. The process for making chlorophenylchlorosilanes containing more than three chlorine atoms per phenyl nucleus, which process comprises chlorinating with gaseous chlorine a phenylchlorosilane corresponding to the general formula $$(C_6H_5)_n SiCl_{4-n}$$

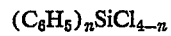

where $n$ is an integer equal to from 1 to 3, inclusive, in the presence of catalytic amounts of a mixed catalyst system composed of finely divided iron metal which is convertible to ferric chloride under the aforesaid chlorination, and antimony pentachloride.

3. The process for making a chlorophenyltrichlorosilane containing more than three chlorine atoms on the phenyl nucleus, which process comprises passing gaseous chlorine through phenyltrichlorosilane at a temperature of at least 50° C. until there is obtained a mixture of chlorophenyltrichlorosilanes containing an average of more than three chlorine atoms per phenyl nucleus in the phenyltrichlorosilane, in the presence of a mixed catalyst system composed of finely divided ferric chloride and antimony pentachloride, the ferric chloride being present, by weight, in an amount equal to from 0.05 to 10 parts of the latter per part antimony pentachloride, the total weight of the ferric chloride and antimony pentachloride ranging from 0.1 to 3 percent, by weight, based on the weight of the phenyltrichlorosilane.

4. The process for obtaining good yields of chlorodiphenyldichlorosilanes containing more than three chlorine atoms on the phenyl nucleus, which process comprises passing gaseous chlorine through diphenyldichlorosilane at a temperature of at least 50° C. until there is obtained a mixture of chlorodiphenyldichlorosilanes containing an average of more than three chlorine atoms per phenyl nucleus in the diphenyldichlorosilane, in the presence of a mixed catalyst system composed of finely divided ferric chloride and antimony pentachloride, the ferric chloride being present, by weight, in an amount equal to from 0.05 to 10 parts of the latter per part antimony pentachloride, the total weight of the ferric chloride and antimony pentachloride ranging from 0.1 to 3 percent, by weight, based on the weight of the diphenyldichlorosilane.

5. The process for making a chlorophenyltrichlorosilane containing more than three chlorine atoms on the phenyl nucleus, which process comprises passing gaseous chlorine through phenyltrichlorosilane at a temperature of at least 50° C. until there is obtained a mixture of chlorophenyltrichlorosilanes containing an average of more than three chlorine atoms per phenyl nucleus in the phenyltrichlorosilane, in the presence of a mixed catalyst system composed of finely divided metallic iron which, under the chlorination conditions recited above, is converted to ferric chloride, and antimony pentachloride, the iron calculated as ferric chloride being present, by weight, in an amount equal to from 0.05 to 10 parts of the latter per part antimony pentachloride, the total weight of the iron calculated as ferric chloride and antimony pentachloride ranging from 0.1 to 3 percent, by weight, based on the weight of the phenyltrichlorosilane.

References Cited in the file of this patent

UNITED STATES PATENTS

| | | |
|---|---|---|
| 2,258,219 | Rochow | Oct. 7, 1941 |
| 2,803,638 | Holdstock | Aug. 20, 1957 |

OTHER REFERENCES

Yakubovich et al.: "Doklady Akad. Nauk.," (USSR), vol. 91 (1953), pp. 277–80.

Yakubovich et al.: ibid., vol. 99, No. 6 (1954), pp. 1015–18.